(12) United States Patent
Smits et al.

(10) Patent No.: US 8,373,361 B2
(45) Date of Patent: Feb. 12, 2013

(54) GREENHOUSE SYSTEM

(75) Inventors: Jan J. Smits, Hoek van Holland (NL); Gerrit Oosterhuis, Best (NL); Antonius Paulus Aulbers, Eindhoven (NL)

(73) Assignee: Nederlandse Organisatie Voor Toegepast-Natuurewetenschappelijk Onderzoek Tno, Delft (NL)

( * ) Notice: Subject to any disclaimer, the term of this patent is extended or adjusted under 35 U.S.C. 154(b) by 0 days.

(21) Appl. No.: 12/681,101

(22) PCT Filed: Oct. 3, 2008

(86) PCT No.: PCT/NL2008/050635
§ 371 (c)(1),
(2), (4) Date: Jul. 28, 2010

(87) PCT Pub. No.: WO2009/045107
PCT Pub. Date: Apr. 9, 2009

(65) Prior Publication Data
US 2010/0289411 A1   Nov. 18, 2010

(30) Foreign Application Priority Data
Oct. 3, 2007   (EP) ..................................... 07117824

(51) Int. Cl.
*G05F 1/00* (2006.01)
*H05B 37/02* (2006.01)
*H05B 39/04* (2006.01)
*H05B 41/36* (2006.01)
*A01G 9/00* (2006.01)

(52) U.S. Cl. .......................................... 315/297; 47/17

(58) Field of Classification Search .................. None
See application file for complete search history.

(56) References Cited

U.S. PATENT DOCUMENTS
2007/0044445 A1 * 3/2007 Spicer et al. ................... 56/10.1

FOREIGN PATENT DOCUMENTS

| EP | 1 374 665 A | | 1/2004 |
|---|---|---|---|
| EP | 1 374 667 A | | 1/2004 |
| EP | 1374665 A1 | * | 1/2004 |
| EP | 1 621 069 A | | 2/2006 |
| WO | WO 2007/105946 A | | 9/2007 |
| WO | WO 2007105946 A2 | * | 9/2007 |

OTHER PUBLICATIONS

Schuerger et al, Spectral Quality Affects Disease Development of Three Pathogens on Hydroponically Grown Plants, 1997, HortScience (online). <retrieved on Nov. 18, 2011>. <URL: http://hortsci.ashpublications.org/content/32/1/96.full.pdf>.*
Schuerger et al, Spectral Quality Affects Disease Development of Three Pathogens on Hydroponically Grown Plants, 1997 HortScience (online). <retrieved on Nov. 18, 2011>. <URL: http://hortsci.ashspublications.org/content/32/1/96.full.pdf>.*
International Search Report issued in PCT/NL2008/050635 dated Mar. 2, 2009.

* cited by examiner

*Primary Examiner* — Douglas W Owens
*Assistant Examiner* — Dedei K Hammond
(74) *Attorney, Agent, or Firm* — Knobbe, Martens, Olson & Bear, LLP

(57) ABSTRACT

Greenhouse system may comprise an illumination, a sensor, and a controller. The illumination and controller are arranged to vary the intensity and the spectral distribution of the light emitted by the illumination. The emitted light may be pulsed light, the pulse characteristics being variable by the controller in dependency of the output of the sensor. The controller is arranged to interpret the relevant variables measured by the sensor and to assess the actual and/or expected growth of the relevant plants, and to control the intensity and/or the spectral distribution of the light emitted by the illumination. Some sensors may be provided for measuring the intensity and/or spectral distribution of the actual light in the greenhouse, other sensors for measuring plant dimensions of the relevant plants or plant groups. The illumination may comprise a heat collector which can be connected to heating or air conditioning inside or outside the greenhouse.

6 Claims, 1 Drawing Sheet

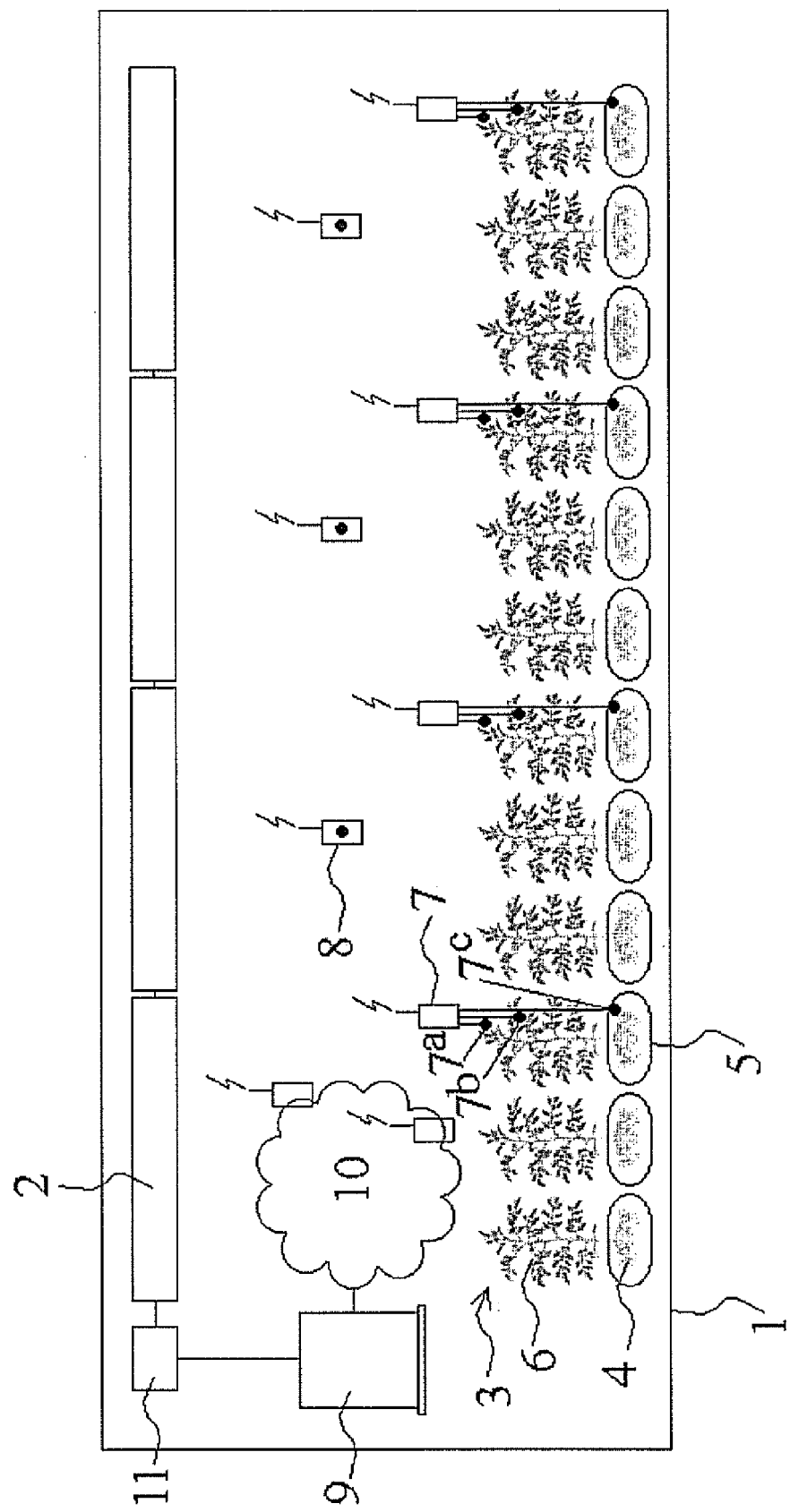

GREENHOUSE SYSTEM

This application is a U.S. National Phase of International Application No. PCT/NL2008/050635, filed Oct. 3, 2008, designating the U.S. and published in English as WO 2009/045107 on Apr. 9, 2009 which claims the benefit of European Patent Application No. 07117824.8 filed Oct. 3, 2007.

FIELD OF THE INVENTION

The present invention concerns a greenhouse system, comprising lamps for the illumination of plants etc. inside the greenhouse for the benefit of plant growth.

BACKGROUND

Greenhouse system, comprising illumination means for the illumination of plants etc. are of common knowledge.

Recent years have shown increasing practical application of large-scale plant growing systems that make use of artificial light sources, which are less susceptible to the effects of external factors (such as long- and short-term weather conditions and insect damage). The most commonly-used light sources include high-pressure sodium lamps, low-pressure sodium lamps, xenon lamps, metal halide lamps, fluorescent lamps, and microwave lamps. Of these, high-pressure sodium lamps are the most popular because of their relatively high luminous efficiency. Still, an artificial light source such as a high-pressure sodium lamp strikes a poor balance between red (wavelength band: 640 to 690 nm) and blue (wavelength band: 420 to 470 nm), which is important for photosynthesis etc., and therefore the output had to be raised in order to cultivate healthy plants. Furthermore, low-pressure sodium lamps have higher luminous efficiency than high-pressure sodium lamps, but pose problems with optical quality because they output single-wavelength light of the sodium D line, and it is also difficult to raise the output.

Another problem with artificial light sources is that the large amount of radiated heat imposes a heavy load on air-conditioning units, and the plants have to be kept sufficiently far away from the light source in order to keep them from being damaged by this thermal radiation; this tends to result in a bulkier apparatus.

In view of the above problems, artificial light sources that make use of semiconductor based light emitting devices, hereinafter abbreviated as SBLED(s), e.g. light emitting diodes (LEDs), have been proposed in some publications, e.g. in EP1374665. SBLEDs are already available for various wavelengths between about 350-750 nm and in various different embodiments; and the developments are still going on. EP1374667 discloses a mini greenhouse with a LED spotlight. With semiconductor based light emitting devices, there is less load on air-conditioning equipment because elements with a light emitting wavelength band that does not include heat rays can be employed, and the apparatus can also be made more compact, so luminous efficiency is better. Another advantage is that the life of a light emitting diode is several times longer than that of a high-pressure sodium lamp. Also, the shape of the illuminator can flexibly and easily be modified in accordance with the plants being illuminated, and the light density can easily be controlled by arranging numerous semiconductor based light emitting devices in a linear or planar array.

Another advantage of using semiconductor based light emitting devices is that irradiation with pulsed light is possible. When light is pulsed (intermittent light emission), the amount of photosynthesis per unit of light would be increased over that achieved with continuous light, without optical saturation which may occur under intense light. It is stated that the utilization efficiency of light is better using short-period pulsed light than using continuous light.

EP1374667 also describes the use of sensors like an ambient humidity sensor, a temperature sensor and a light sensor in the mini-greenhouse. The devices for heating, ventilation nebulization and irrigation and the lamp can thus be feedback controlled to maintain the corresponding parameters. The temperature sensor commands a heater or a ventilator, the air humidity sensor activates the nebulizer and the soil humidity sensor activates irrigation.

WO 2007/105946 describes a light sensor for use in a greenhouse. The sensor has the structure of an artificial plant, with sensing devices mounted on its leaves. This enables measurements on light that has been filtered by the leaves of the plants. The document describes that the light can be analysed over the entire light spectrum or that parts of the spectrum that are important for the growth of the crop can be analyzed. This gives a three dimensional picture of the incident light over the height of the plants. The document describes that the sensor can be used to influence artificial lighting or to study the development of a crop. Lighting for the plants can be controlled accurately depending on the stage of growth of the plants and the desired yields.

Although WO 2007/105946 mentions that in the end less energy will be required, it does not discuss any specific energy saving measures. Nor does it describe measurement of spectral distribution or its use outside obtaining a three dimensional picture of incident light over the crop height.

SUMMARY

It is an object to promote the growth, development and health of the plants. Another object is to realize substantial energy savings.

Enhanced monitoring or sensing the growth, development and/or health of the relevant plants and adequate "fine tuning" of the properties of their illumination is provided. Embodiments are set forth in claims 1 and 2.

In an embodiment at least one of $CO_2$ pressure, temperature air humidity and soil humidity is sensed and used to limit light intensity. Thus excess light intensity can be reduced to save power when it is sensed that growth is limited anyway by one or more of these factors.

In an embodiment the lamp or lamps and the controller are arranged to vary the intensity as well as the spectral distribution of the light emitted by the lamp or lamps. This enables the possibility of varying the spectral density distribution in dependency of the actual growth, development or health of the plants, e.g. with regard to the size of the (sensed) plant roots, leaf size, stem size, fruit or flower size etc. Moreover, when pests, plant diseases etc. is sensed, it is preferred that the emitted light comprises a spectrum which is relevant for pest and/or disease control.

In a further embodiment a lamp or lamps comprising one or more SBLED arrays may be used, the emitted light of which mainly covers a spectral distribution which is relevant for the plant growth.

As known as such from the prior art, the emitted light may be pulsed light, wherein, according to an option, the pulse characteristics may be varied by the control means in dependency of the output of the sensor.

In an embodiment the controller is arranged to interpret the relevant variables measured by the sensor and to assess the actual and/or expected growth of the relevant plants, and to control the intensity and/or the spectral distribution of the light emitted by the lamp to those relevant plants in accordance with the assessment result.

E.g. in greenhouses which are arranged to use incident (sun)light, one or more sensors may be provided for measuring the intensity and/or spectral distribution of the actual light in the greenhouse, thus enabling that such incident light may be e.g. filtered, screened etc. by filters, screens etc., or that the incident light is supplemented by the artificial, spectrally "fine tuned" illumination.

One or more sensors may be provided for measuring one or more plant dimensions, e.g. the size of the plant roots, leafs, stems, fruits or flowers, of the relevant plants or groups of plants.

BRIEF DESCRIPTION OF THE DRAWING

FIG. 1 shows an exemplary configuration of the greenhouse system

EXEMPLARY EMBODIMENT

In FIG. 1 a greenhouse 1 comprises lamps for the illumination of plants etc, inside the greenhouse for the benefit of plant growth, which are formed by several illumination armatures 2. The armatures 2 each comprise one or more SBLED arrays (not shown explicitly), the emitted light of which mainly covers a spectral distribution which is relevant for the growth, development or health of plants 3 inside the greenhouse. Moreover, the emitted light may comprise a spectrum which is relevant for pest and/or disease control. The roots 4 of those plants 3 may be surrounded by tubes 5, via which nutrients, water etc. may be supplied to those roots. The plant's stem(s) and leafs 6 extend upwards into the greenhouse. Sensors modules 7 are provided for measuring variables that are directly or indirectly related to the growth, development or health of the plants, either all plants together or—as shown—in relevant groups or individually. Each sensor module 7 may comprise different sensors 7a, 7b and 7c, related to different aspects of the plant growth, development or health, e.g. the plant (stem) height, the size of the leafs and the density of the roots. Besides sensors for measuring plant dimensions and other plant characteristics, sensors 8 may be provided for measuring e.g. environmental variables like the intensity and/or spectral distribution of the actual light in the greenhouse which may be a mixture of incident natural light and artificial light from the armatures 2. Relevant sensor types may comprise sensors for sensing:

PAR (Photo Active Radiation) light air humidity room temperature
plant temperature
mean temperature over e.g. 24 hours
$CO_2$ ($CO_2$ pressure)
efficiency photo synthesis
plant stress or illumination load
amount of stored CO2 (via assimilation model)
amount of used light
substrate temperature
electric conductivity of the substrate
moisture content of the substrate
Vapor Pressure Deficit
light sum
degree hours
thickness of the leaf or stem
sap flow A computerized control module 9 acts as a controller which is arranged to control the SBLED armatures 2 in dependency of the output of the sensors 7 and 8. The sensors 7 and 8 are configured to communicate with the control module 9 via a (e.g. short distance) wireless network 10. The control module 9 may control the SBLED armatures 2 via a illumination driver 11 (which of course can be incorporated in the control module 9).

The SBLED armatures 2 and the control module 9 are arranged to vary the intensity and the spectral distribution of the light emitted by the SBLED arrays inside the armatures 2. The SBLED array(s) comprise SBLEDs having different emission wavelengths, e.g

| Colour | Wavelength |
|---|---|
| Near UV | 385 nm |
| Blue | 464 nm |
| Red-orange | 622 nm |
| Red | 637 nm |
| Red | 640 nm |
| Deep red | 662 nm |
| Infrared | 736 nm |

The control module 9 (via driver 11) is able to energize the SBLEDs per individual colour, thus realizing that the distribution of the whole wavelength spectrum from 464 nm through 736 nm can be varied in (mean) intensity. As the behaviour of the plants depends on the wavelength distribution of the emitted light, in this way the condition of the plants can be measured by the sensors 7/8 and that plant condition can—if necessary—be corrected by changing the intensity per wavelength distribution of the light. In this way the efficiency of growth process can be optimized automatically, resulting in optimal plant quality, minimal waste and minimal energy consumption for artificial illumination, ventilation etc.

E.g. in greenhouses which are arranged to use incident (sun)light the spectral distribution of the incident light may vary. In this case the incident light can be supplemented by artificial light from armatures 2, to "fine tune" the illumination. In this way a required spectral density distribution of the light can be set according to actual growth, development or health of the plants. The artificial light can be controlled in a feedback loop, so that the measured actual light, which is a combination of the incident light and the artificial light, complies with the required spectral density distribution. When pests, plant diseases etc. is sensed, a required spectral distribution may be set that is relevant for pest and/or disease control. For example, a predetermined spectrum, defined for a pest, plant disease etc may be used to set the required spectrum when the pest, plant disease is detected.

The (mean) intensity of the various SBLEDs may be varied by means of pulsed SBLED energizing e.g. by variation of the width ratio between the energizing and the non-energizing periods of the pulses, i.e. by pulse width variation, and/or by varying the pulse shape and/or the pulse frequency. Besides for the benefit of being able to vary the intensity of the various SBLEDs, the utilization efficiency of light is considered to be better with pulsed light than with continuous light (see also e.g. EP1374665).

The control module 9 is configured, by means of dedicated software and/or hardware, e.g. comprising a kind of plant behaviour model, to interpret the relevant variables measured by the sensor modules 7/8 and to assess, by using that model, the actual and/or expected growth of the relevant plants, and, as a result, to control the intensity and/or the spectral distribution of the light emitted by the illumination armatures 2 to the relevant plants (e.g. plant groups or individual plants) in accordance with the assessment result from the plant behaviour model. In this way, when e.g. is assessed that a plant (group) is growing too fast or too slow, or doesn't develop fruit in time etc., those deficiencies can be counteracted by adequate illumination (and possibly further) measures, e.g. including that the wavelength distribution emitted by the illumination armatures 2 is changed by the control module 9.

In an embodiment control module 9 may be configured to limit light intensity when it determines that mode light intensity will not result in more photosynthesis. It is known per se that the rate of photosynthesis depends on external factors such as light intensity, CO2 pressure, temperature, air humidity and soil humidity. Although the relation between these external factors and the rate of photosynthesis is complex, in can be said in general terms that any of these factors can be a limiting factor, i.e. that given the value of one factor, threshold values can be specified for the other factors above which increases in the other factors do not result in significantly increased photosynthesis.

This can be used to avoid waste of energy spent on light intensity. When control module 9 determines that a current value of an external factor that affects photosynthesis defines a threshold value for the light intensity beyond which more light intensity does not result in significantly more photosynthesis, control module 9 limits the light intensity to the threshold. Thus power consumption for lighting can be reduced without loss of growth. To determine the threshold value, control module 9 may be provided with one or more tables of threshold values for different values of an external factors. Such values are known per se. Alternatively, control module 9 may be provided with a program to compute the threshold value using a mathematical formula. Formulas for this purpose are also known per se.

A reduction of power consumption can be realized already when one of CO2 pressure, temperature, air humidity and soil humidity is used to determine the threshold value for light intensity. Moreover, when it is ensured that a specific external factor is always well above the threshold value defined by another factor that is measured, there may be no need to use measurements of the specific external factor. Thus for example, when soil humidity is accurately controlled, but temperature can vary, intensity limitation dependent on soil humidity may not be needed when limitation based on temperature is used. When sensor measurements of a plurality of the factors CO2 pressure, temperature, air humidity and soil humidity are used, each measurement may be used individually to determine a threshold value for the light intensity and control unit 9 may be configured to use the lowest of these threshold values to limit the light intensity of the lamps.

Finally, it is noted that, to still increase the energy efficiency of the greenhouse system, the SBLED armatures 2 may be cooled by means of a cooling medium, e.g. a fluid or air, which cooling medium preferably can be connected to a heating or air conditioning system of the greenhouse, thus enabling that the energy which in the armatures 2 is not converted into light but into heat (about 75%), can be recuperated. This is a special opportunity of SBLED armatures, as in SBLEDs, as a result of their nature, the heat is mainly generated at the backside of the SBLEDs (contrary to e.g. in sodium lamps etc. which radiate their heat from their illuminating front side) and, due to that, can be collected from the backside of the armatures 2 without hindering the light emission at the frond side, and can—via a cooling medium and a circulation system—supplied to the greenhouse's heating or air conditioning system or any other heating or air conditioning system.

What is claimed is:

1. Greenhouse system for providing illumination to plants in a greenhouse for the benefit of plant growth, the system comprising
    a lamp or lamps for the illumination of the plants inside the greenhouse;
    a sensor or sensors for measuring wavelength distribution of actual light in the greenhouse; and
    a controller coupled to the lamp or lamps and the sensor or sensors and configured to control the lamp or lamps in dependency of the output of the sensor or sensors by varying intensity and spectral distribution of the light emitted by the lamp or lamps in dependency of the output of the sensor or sensors for measuring the wavelength distribution.

2. Greenhouse system according to claim 1, the lamp or lamps comprising one or more arrays of semiconductor based light emitting devices (SBLEDs), the emitted light of which covers a spectral range which is relevant for the plant growth.

3. Greenhouse system according to claim 2, wherein the lamp or lamps are configured to emit pulsed light, the controller being configured to vary the pulse characteristics in dependency of the output of the sensors.

4. Greenhouse system according to claim 1, wherein the lamp or lamps comprise a heat collector with an output connected to a heater or air conditioner inside or outside the relevant greenhouse.

5. A tangible, non-transitory, computer-readable medium comprising a computer program with instructions that, when executed by a programmable computer, will cause the computer to interpret at least one of $CO_2$ pressure, temperature, air humidity and soil humidity measured by a sensor or sensors in a greenhouse and to assess the actual and/or expected growth of plants, and to generate a control signal for controlling the intensity and/or the spectral distribution of light emitted by a lamp or lamps, to those plants in accordance with a result of the assessment.

6. A tangible, non-transitory, computer-readable medium comprising a computer program with instructions that, when executed by a programmable computer, will cause the computer to interpret wavelength distribution of actual light in the greenhouse measured by a sensor or sensors in a greenhouse and to assess the actual and/or expected growth of plants, and to generate a control signal for controlling the intensity and/or the spectral distribution of light emitted by a lamp or lamps, to those plants in accordance with a result of the assessment.

* * * * *

UNITED STATES PATENT AND TRADEMARK OFFICE
CERTIFICATE OF CORRECTION

PATENT NO.        : 8,373,361 B2                                                          Page 1 of 1
APPLICATION NO. : 12/681101
DATED             : February 12, 2013
INVENTOR(S)       : Smits et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 87 days.

Signed and Sealed this
First Day of September, 2015

Michelle K. Lee
*Director of the United States Patent and Trademark Office*